United States Patent [19]

Agron et al.

[11] Patent Number: 4,517,557
[45] Date of Patent: May 14, 1985

[54] ALARM HOUSING FOR RODENT CONTROL DEVICE

[75] Inventors: Michael H. Agron, Santa Monica; James R. Buch, San Pedro; Robert E. LaVoie, Thousand Oaks, all of Calif.

[73] Assignee: Ace Pest & Termite Control Co., Culver City, Calif.

[21] Appl. No.: 506,287

[22] Filed: Jun. 21, 1983

[51] Int. Cl.³ .............................................. G08B 21/00
[52] U.S. Cl. ......................................... 340/540; 43/82
[58] Field of Search .................. 43/58, 61, 67, 70, 74, 43/82, 98; 340/573, 568, 540, 541

[56] References Cited

U.S. PATENT DOCUMENTS

| | | | |
|---|---|---|---|
| 3,111,608 | 2/1961 | Boenning et al. | 340/573 |
| 3,430,380 | 1/1967 | Poff | 43/81 |
| 3,468,054 | 9/1969 | Levine | 43/98 |
| 3,656,141 | 4/1972 | Hill | 340/573 |
| 3,827,176 | 8/1974 | Stirewalt | 43/98 |
| 4,038,639 | 7/1977 | Kuebler | 340/573 |

Primary Examiner—James L. Rowland
Assistant Examiner—Jeffery A. Hofsass
Attorney, Agent, or Firm—Harris, Kern, Wallen & Tinsley

[57] ABSTRACT

An alarm housing for a rodent control device such as a spring actuated trap. A frame with opposed side and end members defining a trap opening for receiving the trap, and an electrical switch mounted in the frame so that positioning of the trap in the frame moves the switch to one circuit condition. Tripping of the trap by a rodent produces a lifting action which moves the trap upward out of the frame permitting the electrical switch to move to the opposite circuit condition thereby providing an indication of actuation of the trap.

7 Claims, 3 Drawing Figures

ALARM HOUSING FOR RODENT CONTROL DEVICE

BACKGROUND OF THE INVENTION

This invention relates to rodent control devices and more particularly, to an alarm housing for providing an indication of when a rodent trap has been actuated.

The long known spring actuated rodent trap remains one of the simplest and best devices for rodent control. The spring actuated trap is inexpensive, easily operated and installed, and relatively satisfactory in its operation. However when a large number of such traps are utilized in an area continuous surveillance is necessary in order to locate and reset traps which have been actuated either by a rodent or other means and which may or may not have actually caught a rodent, since a sprung trap is no longer effective. Periodic inspection of all traps has its drawbacks, unless the inspection is at very short intervals, and frequent inspection of course increases the cost of operating the rodent control system.

Accordingly, it is an object of the present invention to provide an inexpensive and reliable arrangement for continuously monitoring the condition of traps, thereby eliminating the necessity for visual inspection of all traps either on a periodic basis or random basis.

It is a particular object of the invention to provide an alarm housing for a rodent control device having an electrical switch carried in a frame in which the rodent trap is inserted. A further object is to provide for such a structure wherein tripping of the trap actuates the electrical switch thereby providing an alarm indication through an appropriate electrical circuit.

Other objects, advantages, features and results will more fully appear in the course of the following description.

SUMMARY OF THE INVENTION

An alarm housing for a rodent control device such as a spring actuated trap, comprising a frame with a trap opening and an electrical switch carried in the frame and positioned so that the switch is moved to one circuit condition when a trap is in position in the frame, and moved to the opposite circuit condition when the trap is not in the frame, as is caused by tripping of the trap.

DESCRIPTION OF THE PREFERRED EMBODIMENTS

Figure 1:
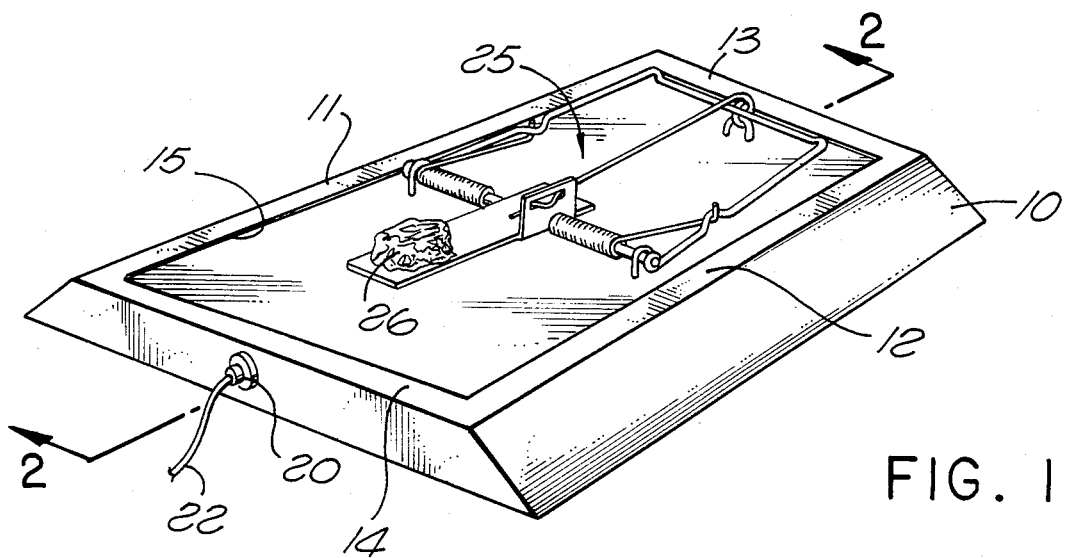
FIG. 1 is an isometric view of an alarm housing with a rodent trap mounted therein, and incorporating the presently preferred embodiment of the invention.
Figure 2:
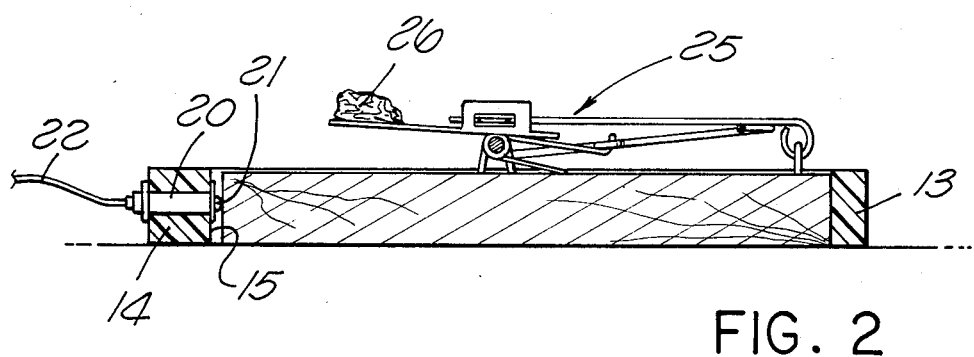
FIG. 2 is a sectional view taken along the line 2—2 of FIG. 1.

The alarm housing of FIGS. 1 and 2 includes a frame 10 with side members 11, 12 and end members 13, 14 defining an opening 15. The side members 11, 12 preferably are sloped or tapered, as seen in FIG. 1. The frame may be made of wood, typically by joining four pieces together, or may be molded or otherwise formed of plastic, as desired. Also, the frame could be made of metal but this ordinarily would be a more expensive and hence less desirable mode of construction.

An electrical switch 20 is mounted in the frame, typically in one of the frame members, and is shown in the end member 14 in FIGS. 1 and 2. The switch 20 may be a conventional switch and a plunger type switch is illustrated. The switch includes a switch actuating element 21 which moves between extended and compressed positions, thereby moving the switch between circuit open and circuit closed conditions. The switch may be chosen to provide the open circuit condition for the extended plunger or the closed circuit condition for the extended plunger, as desired. The switch is connected to appropriate monitoring and/or alarm devices by a cable 22. A hermetically sealed magnetic reed switch is preferred because it is better able to withstand moisture and chemicals.

In use, a spring actuated rodent trap 25 is positioned in the opening 15. The opening in the frame is dimensioned so that the trap will fit in the opening and compress the plunger of the switch. When the trap is tripped, as by a rodent nibbling at the bait 26, the spring action of the trap causes the trap to flip upward out of the frame. This action of the trap moves the trap away from the switch, permitting the plunger to move outward to the extended position, and thereby changing the circuit condition of the switch. This switch action is registered at the monitoring and/or alarm station. By this means a maintenance person may be advised to come to the appropriate trap or trap zone and reinstall the trap in the housing and reset the trap, removing the rodent if caught and renewing the bait.

Figure 3:
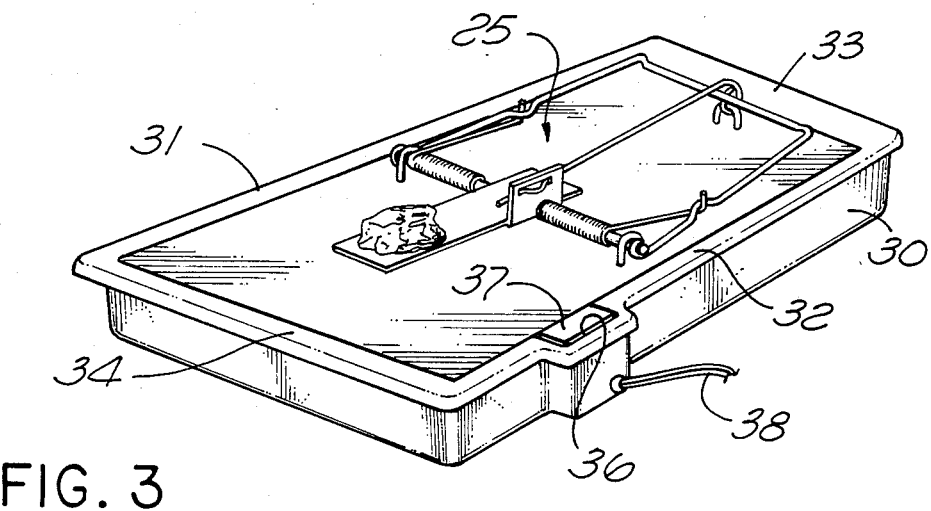
FIG. 3 is a view similar to that of FIG. 1 showing an alternative embodiment of the invention.

The alternative embodiment shown in FIG. 3 utilizes a unitary plastic tray 30 which may be molded or pressed or heat formed as desired, providing a continuous periphery with sides 31, 32 and ends 33, 34. A recess 36 is formed in one of the sides or ends, the side 32 in FIG. 3. An electrical switch 37 is positioned in this recess, with a cable 38 providing electrical circuit connection to the switch. The recess 36 preferably is dimensioned so that the switch can be a press fit in the recess. The switch 37 functions in the same manner as the switch 20, having a switch actuating element which moves between extended and compressed positions. For the embodiment of FIG. 3, a plunger type switch or the relatively new pressure type switch may be used, and the latter is shown.

The operation of the alarm housing of FIG. 3 is the same as that of the housing of FIGS. 1 and 2. When the trap 25 is placed in the tray, the tray and trap are dimensioned so that the switch 37 is compressed to one of circuit closed and circuit open conditions. Then when the trap is flipped out by the spring action, the switch moves to the normal extended position to the other of the circuit conditions.

We claim:

1. An alarm housing for a rodent control device, comprising in combination:
   a frame having means defining a trap opening in said frame for receiving a rodent trap; and
   an electrical switch mounted in said frame and having a switch actuating element movable between circuit open and circuit closed conditions, whereby a trap when positioned in said frame opening moves said switch actuating element to one of said circuit conditions, and tripping of the trap moves the trap out of said frame opening so that said switch actuating element may move to the other of said circuit conditions.

2. An alarm housing as defined in claim 1 wherein said frame has opposed side and end members with said electrical switch mounted in one of said members.

3. An alarm housing as defined in claim 2 wherein said switch actuating element is movable between extended and compressed positions, with said element normally in said extended position, and with a trap when positioned in said frame opening engaging said element moving it to said compressed position.

4. An alarm housing as defined in claim 1 wherein said switch actuating element is movable between extended and compressed positions, with said element normally in said extended position, and with a trap when positioned in said frame opening engaging said element moving it to said compressed position.

5. An alarm housing as defined in claim 4 wherein said electrical switch is a plunger type switch.

6. An alarm housing as defined in claim 4 wherein said electrical switch is a pressure type switch.

7. An alarm housing as defined in claim 1 wherein said frame comprises a unitary tray with a continuous periphery defined by opposed side and end members, and having a recess in one of said members with said electrical switch positioned therein.

* * * * *